US010255725B2

(12) United States Patent
Nocon et al.

(10) Patent No.: US 10,255,725 B2
(45) Date of Patent: Apr. 9, 2019

(54) AUGMENTED REALITY INTERACTIVE EXPERIENCE

(71) Applicant: Disney Enterprises, Inc., Burbank, CA (US)

(72) Inventors: Nathan Nocon, Valencia, CA (US); Katherine M. Bassett, Pasadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/353,688

(22) Filed: Nov. 16, 2016

(65) Prior Publication Data
US 2018/0137680 A1 May 17, 2018

(51) Int. Cl.
A63F 13/00 (2014.01)
G02B 27/01 (2006.01)
G06F 3/147 (2006.01)
G06T 19/00 (2011.01)

(52) U.S. Cl.
CPC ............ G06T 19/006 (2013.01); A63F 13/00 (2013.01); G02B 27/0172 (2013.01); G06F 3/147 (2013.01); G02B 2027/014 (2013.01); G02B 2027/0138 (2013.01); G09G 2354/00 (2013.01)

(58) Field of Classification Search
None
See application file for complete search history.

(56) References Cited

U.S. PATENT DOCUMENTS

| 2011/0102459 A1* | 5/2011 | Hall ...................... A63F 13/10 345/633 |
| 2012/0244939 A1* | 9/2012 | Braun .................... G06K 9/228 463/31 |
| 2015/0348330 A1* | 12/2015 | Balachandreswaran ..................... A63F 13/00 463/5 |
| 2017/0144067 A1* | 5/2017 | Murillo ................ A63F 13/428 |

* cited by examiner

Primary Examiner — Kee M Tung
Assistant Examiner — Yanna Wu
(74) Attorney, Agent, or Firm — Farjami & Farjami LLP

(57) ABSTRACT

An augmented reality (AR) system for providing an AR experience to a user of an AR venue includes a hardware processor, a memory, a light detector, a display, and an AR application stored in the memory. The hardware processor can execute the AR application to provide a virtual environment corresponding to the AR venue on the display, and to detect a light event resulting from interaction of an infrared (IR) light produced by an AR accessory utilized by the user with a surface within the AR venue. The hardware processor can further execute the AR application to identify a location of the light event within the AR venue, determine whether the location of the light event is within an activation zone of the AR venue, and render a visual effect corresponding to the light event on the display if the location is within the activation zone.

18 Claims, 4 Drawing Sheets

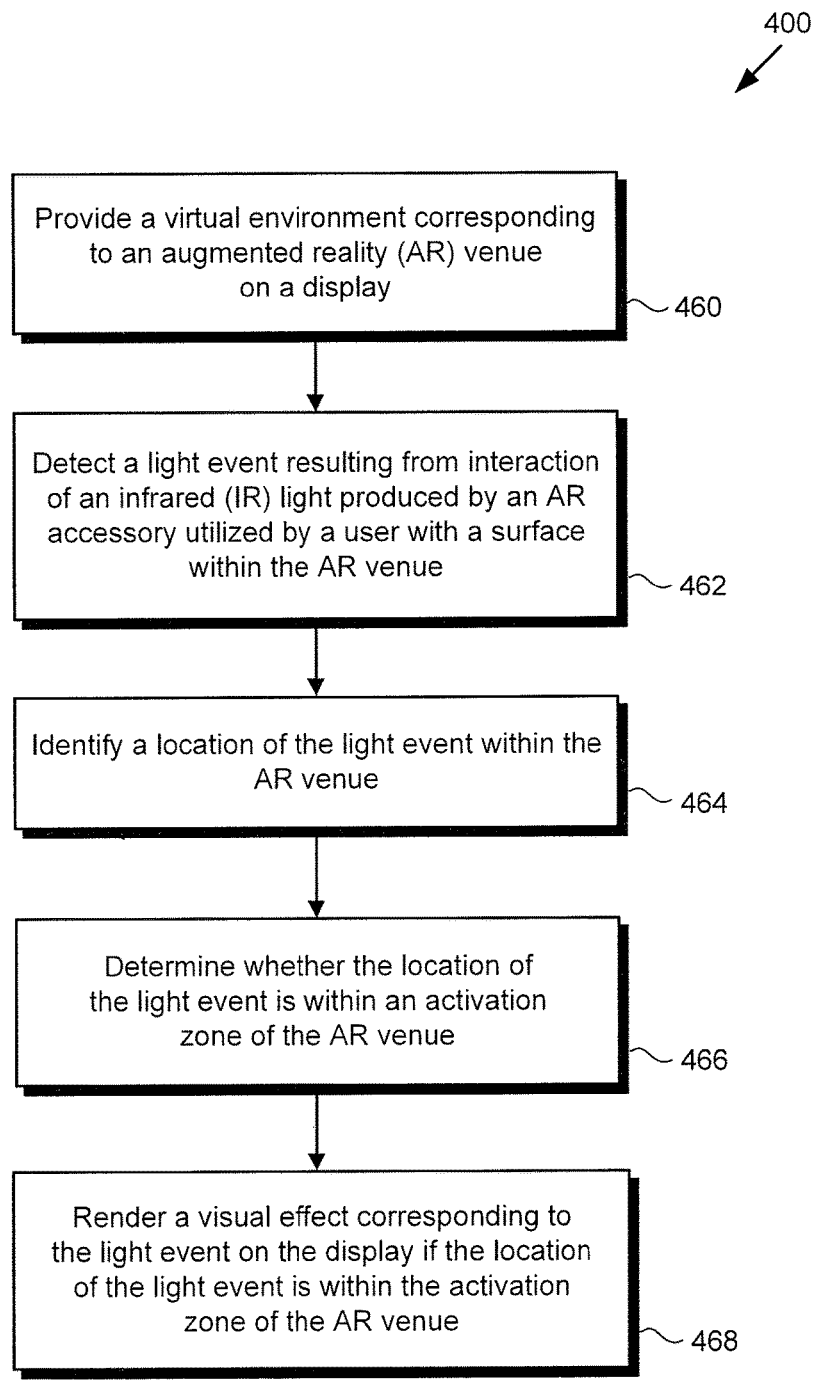

AUGMENTED REALITY INTERACTIVE EXPERIENCE

BACKGROUND

Augmented reality (AR) experiences, such as single and multi-player AR games, merge computer generated imagery with real physical actions in a way that provides a deeply immersive and stimulating sensory experience to a user. One constraint imposed by conventional AR applications can be the data processing overhead required to track and render interactions between such a user, and other users or objects within an AR environment. For example, in a multi-player simulated combat game, tracking and rendering the movements of opposing players, the trajectories of their simulated weapons, and the hits scored by each player against others may require substantial computing resources. However, due to the ever wider use of mobile computing devices, such as smartphones, for example, an AR tracking and rendering solution requiring less intensive data processing is needed.

SUMMARY

There are provided systems and methods for providing an augmented reality (AR) experience to a user of an AR venue, substantially as shown in and/or described in connection with at least one of the figures, and as set forth more completely in the claims.

BRIEF DESCRIPTION OF THE DRAWINGS

FIG. 4 shows a flowchart presenting an exemplary method for providing an AR experience to a user of an AR venue, according to one implementation.

DETAILED DESCRIPTION

Figure 1:
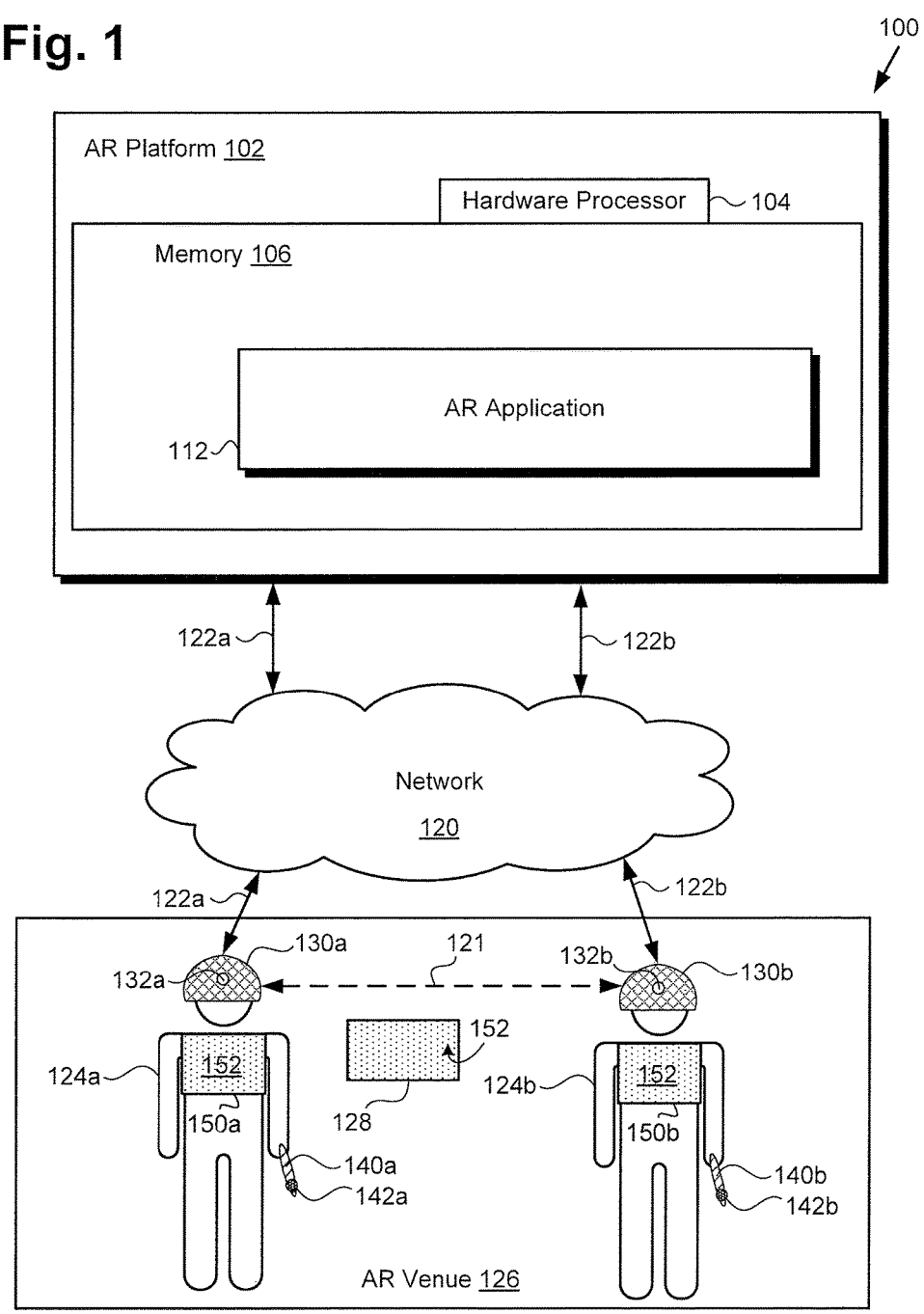
FIG. 1 shows a diagram of systems for providing an augmented reality (AR) experience to a user of an AR venue, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

FIG. 1 shows a diagram of systems for providing an augmented reality (AR) experience to a user of an AR venue, according to one exemplary implementation. As shown in FIG. 1, AR system 100 includes AR platform 102 interactively linked to one or more mobile AR systems 130a and 130b carried or worn by respective users 124a and 124b of AR venue 126. AR platform 102 includes hardware processor 104, and memory 106 storing AR application 112, while mobile AR systems 130a and 130b are shown to include respective light detectors 132a and 132b.

As further shown in FIG. 1, in one implementation, AR platform 102 may be interactively linked to one or both of mobile AR systems 130a and 130b by network 120 and respective network communication links 122a and 122b. In one such implementation, AR platform 102 may correspond to one or more web servers, accessible over a packet network such as the Internet, for example. Alternatively, AR platform 102 may correspond to one or more servers supporting a local area network (LAN), or included in another type of limited distribution network.

Alternatively, or in addition to communicating via AR platform 102, in some implementations, mobile AR systems 130a and 130b may communicate with one another directly, via direct wireless communication link 121 within AR venue 126. Direct wireless communication link 121 may be a Bluetooth link, such as a Bluetooth low energy (BLE) link, for example, or may be a Wi-Fi link. One advantage of such an implementation is that communications between mobile AR systems 130a and 130b via direct wireless communication link 121 that bypass network 120 and AR platform 102 will experience significantly lower latency, thereby enhancing the realism of the AR experience of users 124a and 124b of AR venue 126.

Figure 2:
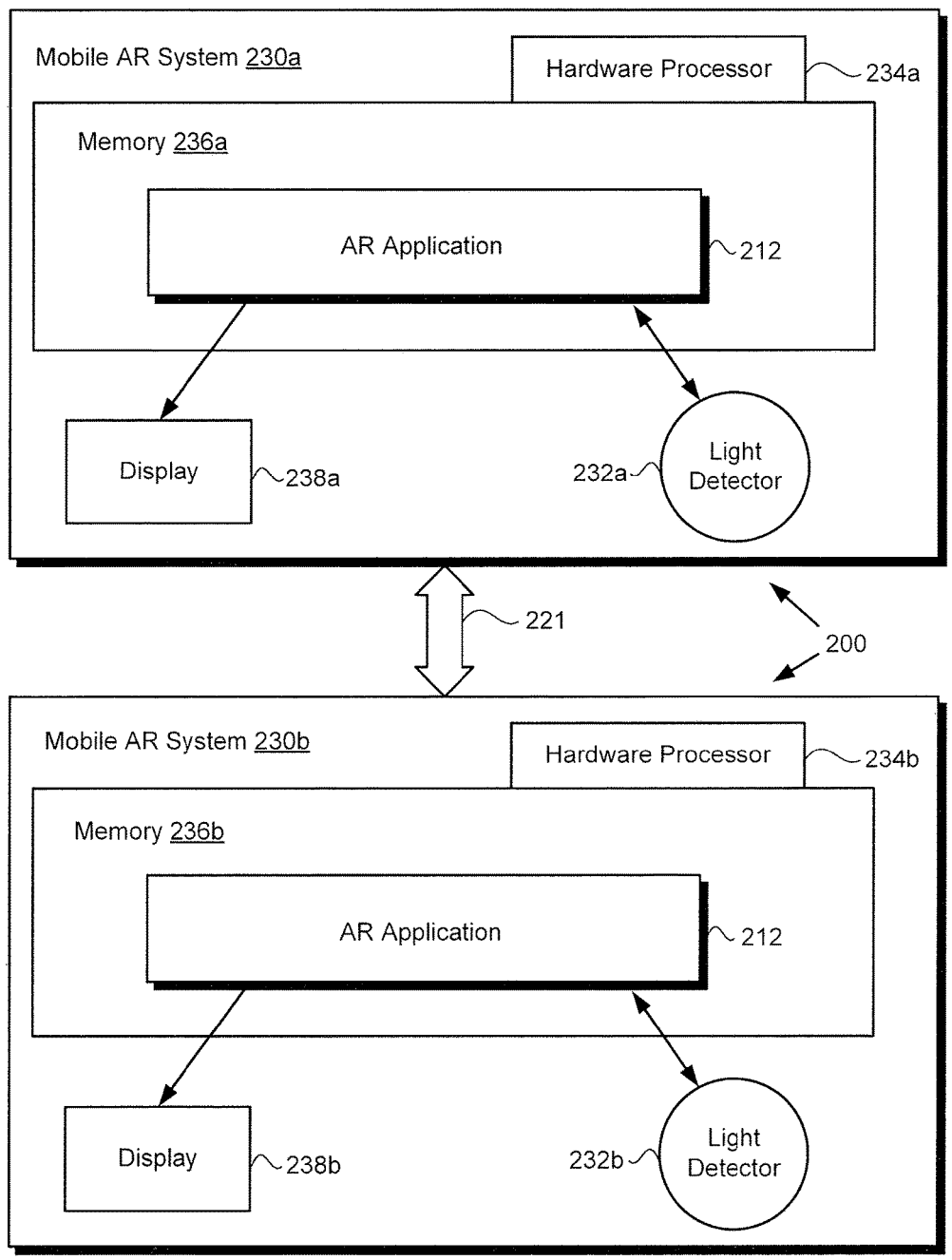
FIG. 2 is a diagram providing a more detailed exemplary representation of mobile AR systems worn or carried by users of an AR venue, according to one implementation.

As will become apparent by reference to FIG. 2, in some implementations, each of mobile AR systems 130a and 130b may include an AR application corresponding to AR application 112, and may be capable of performing substantially the same operations as those performed by AR platform 102. As a result, in those implementations, AR system 100 may omit AR platform 102 and may simply include two or more wirelessly networked mobile AR systems, such as mobile AR systems 130a and 130b.

Also shown in FIG. 1 are AR accessories 140a and 140b, each equipped with respective infrared (IR) light emitter (hereinafter "IR emitter") 142a and 142b. In addition, FIG. 1 shows object 128, and wearable items 150a and 150b worn by respective users 124a and 124b of AR venue 126, all of which are located within AR venue 126. It is noted that each of object 128 and wearable items 150a and 150b present surfaces within AR venue 126 with which IR light can interact. It is further noted that one or more of object 128 and wearable items 150a and 150b and may have deposited thereon IR excitation material 152, such as an IR excitation ink or paint, for example.

According to the exemplary implementation shown in FIG. 1, users 124a and 124b of AR venue 126 may engage in an AR interactive experience, such as an AR player-versus-player (PvP) combat game, within AR venue 126. For example, user 124a may engage user 124b in combat through use of AR accessories 140a and 140b, which may take the form of virtual swords, such as virtual light swords, or shooting toys. Each of AR accessories 140a and 140b may be equipped with a respective IR emitter 142a and 142b, which may be highly directional IR emitters, such as IR lasers for example, implemented to illuminate scoring strikes or hits by each of respective users 124a and 124b.

Mobile AR systems 130a and 130b worn or carried by respective users 124a and 124b can register the scoring strikes or hits achieved by each of respective users 124a and 124b by using respective light detectors 132a and 132b to detect light events resulting from interaction of the IR light produced by respective AR accessories 140a and 140b with surfaces within AR venue 126. For example, each of light detectors 132a and 132b may take the form of multiple IR cameras for detecting reflections of IR light produced by respective AR accessories 140a and 140b and reflected from surfaces within AR venue 126, such as surfaces corresponding to another user, and/or surfaces provided by a wearable item and/or an object within AR venue 126. As a specific example, each of light detectors 132a and 132b may be implemented using two or more IR cameras having a predetermined spatial separation and designed to detect light events, and to identify the location of those light events using triangulation.

Thus, in one implementation, light detector 132a may include multiple IR cameras for detecting reflections of IR light produced by AR accessory 140a and reflected from surfaces provided by other user 124b, and/or wearable item 150b, and/or object 128 within AR venue 126. By analogy, in that implementation, light detector 132b may include multiple IR cameras for detecting reflections of IR light produced by AR accessory 140b and reflected from surfaces provided by other user 124a, and/or wearable item 150a, and/or object 128.

As another specific example, each of light detectors 132a and 132b may take the form of multiple cameras for detecting visible light emitted from surfaces within AR venue 126, such as RGB cameras, for instance, as known in the art. For instance, each of light detectors 132a and 132b may be implemented using two or more RGB cameras having a predetermined spatial separation and designed to detect light events, and to identify the location of those light events using triangulation. That is to say, in one implementation, light detector 132a may include two or more RGB cameras for detecting visible light produced by IR excitation material 152 in response to interaction of IR light produced by AR accessory 140a with surfaces provided by wearable item 150b and/or object 128 within AR venue 126. By analogy, in that implementation, light detector 132b may include two or more RGB cameras for detecting visible light produced by IR excitation material 152 in response to interaction of IR light produced by AR accessory 140b with surfaces provided by wearable item 150a and/or object 128.

It is noted that although FIG. 1 depicts an implementation in which users 124a and 124b engage in a multi-player game within AR venue 126, in other implementations, one of users 124a or 124b may utilize AR venue 126 to have a single user AR interactive experience. For example, user 124a may engage and interact with one or more objects, such as object 128, within AR venue 126. In such an implementation, light detector 132a of mobile AR system 130a may be used to detect IR light reflected from a surface of object 128, or may be used to detect visible light produced by excitation material 152 on a surface of object 128.

It is further noted that in such a single user AR interactive experience, an AR accessory corresponding to AR accessory 140a or 140b may take the form of an accessory other than a virtual combat weapon. For example, in those single user implementations, an AR accessory corresponding to AR accessory 140a or 140b may take the form of a virtual wand, a virtual lantern, or a virtual flashlight including respective IR emitter 142a or 142b.

FIG. 2 is a diagram providing a more detailed exemplary representation of AR system 200 including mobile AR systems 230a and 230b, but omitting AR platform 102 in FIG. 1, according to one implementation. In addition to mobile AR system 230a and mobile AR system 230b, FIG. 2 shows direct wireless communication link 221 for networking mobile AR systems 230a and 230b. As shown in FIG. 2, mobile AR system 230a includes hardware processor 234a, memory 236a storing AR application 212, light detector 232a, and display 238a. As further shown in FIG. 2, mobile AR system 230b includes hardware processor 234b, memory 236b storing AR application 212, light detector 232b, and display 238b.

Mobile AR system 230a and mobile AR system 230b correspond in general to mobile AR system 130a and mobile AR system 130b, in FIG. 1, and may share any of the characteristics attributed to either of those corresponding features in the present application. In addition, direct wireless communication link 221, in FIG. 2, corresponds in general to direct wireless communication link 121, in FIG. 1, and may share any of the characteristics attributed to that corresponding feature in the present application.

Thus, light detectors 232a and 232b, in FIG. 2, correspond respectively in general to light detectors 132a and 132b, in FIG. 1, and may be implemented as two or more IR or RGB cameras, for example. Moreover, although not explicitly shown in FIG. 1, mobile AR system 130a may include a hardware processor, a memory storing an AR application, and a display corresponding respectively in general to hardware processor 234a, memory 236a storing AR application 212, and display 238a, in FIG. 2. Similarly, mobile AR system 130b may include a hardware processor, a memory storing an AR application, and a display corresponding respectively in general to hardware processor 234b, memory 236b storing AR application 212, and display 238b, in FIG. 2.

It is noted that like mobile AR systems 130a and 130b, in FIG. 1, mobile AR systems 230a and 230b, in FIG. 2 may be carried or worn by respective users 124a and 124b. Although mobile AR systems 130a and 130b are shown as headgear, that representation is merely exemplary. In other implementations, mobile AR system 130a/230a and/or 130b/230b may be implemented as goggles, glasses, or another type of eyewear, for example.

Alternatively, in some implementations, mobile AR system 130a230a may include a viewfinder body or shell in which a smartphone can be inserted to provide hardware processor 234a, and memory 236a storing AR application 212, and in some implementations, light detector 132a/232a and/or display 238a as well. Similarly, in some implementations, mobile AR system 130b/230b may include a viewfinder body or shell in which a smartphone can be inserted to provide hardware processor 234b, and memory 236b storing AR application 212, and in some implementations, light detector 132b/232b and/or display 238b as well.

It is further noted that, in some implementations, it may be advantageous or desirable for light detector 132a/232a to have a known special relationship to display 238a and for light detector 132b/232b to have a known special relationship to display 238b. In those implementations, the location of light detector 132a/232a relative to display 238a, and the location of light detector 132b/232b relative display 238b, may be fixed or periodically monitored, for example.

According to some implementations, client AR application 212 may be received by mobile AR systems 130a/230a and 130b/230b from AR platform 102 via respective network communication links 122a and 122b. In some such implementations, network communication links 122a and 122b can corresponds to transfer of AR application 212 over a packet network, such as the Internet, for example.

Once resident on mobile AR systems 130a/130b and 230a/230b, client AR application 212 may be persistently stored in memory 236a/236b and may be executed locally by respective hardware processor 234a/234b. Hardware processor 234a may be the central processing unit (CPU) for mobile AR system 130a/230a, for example, in which role hardware processor 234a runs the operating system for mobile AR system 130a/230a and executes AR application 212. Similarly, hardware processor 234b may be the CPU for mobile AR system 130b/230b, and may run the operating system for mobile AR system 130b/230b and may execute AR application 212.

Figure 3:
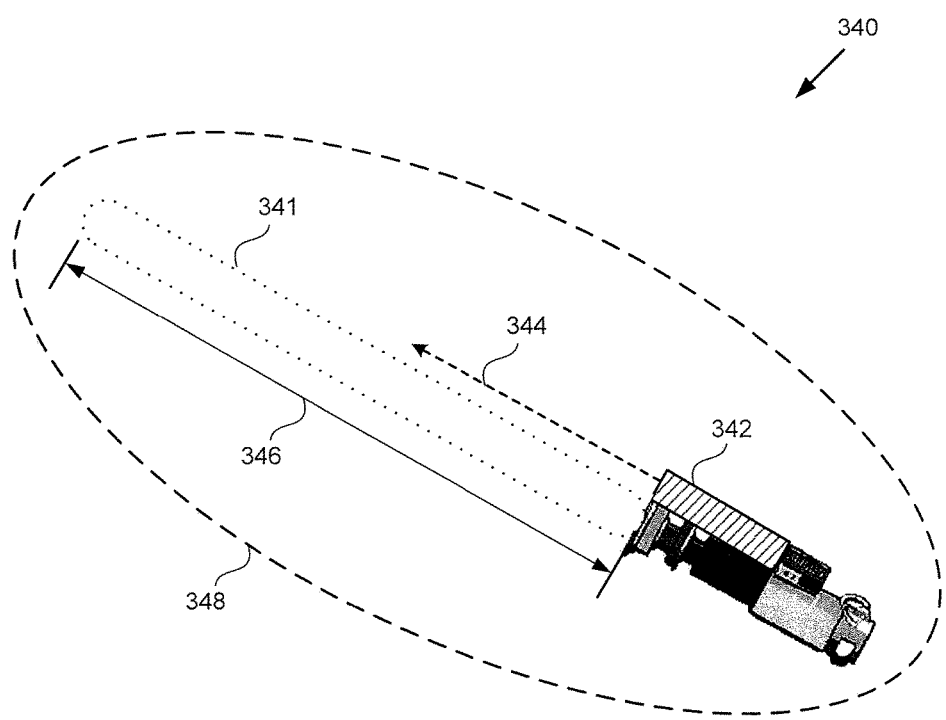
FIG. 3 shows a diagram of an exemplary AR accessory utilized by a user in an AR venue, according to one implementation.

FIG. 3 shows a diagram of an exemplary AR accessory utilized by a user in an AR venue, according to one implementation. As shown in FIG. 3, AR accessory 340 includes IR emitter 342 emitting IR light 344. Also shown are characteristic parameter 346 of AR accessory 340, depicted as exemplary length 346 of virtual sword blade 341 in FIG. 3, and activation zone 348 of AR accessory 340.

AR accessory 340 including IR emitter 342 corresponds to either or both of AR accessories 140a and 140b including respective IR emitters 142a and 142b, in FIG. 1, and those corresponding features may share any of the characteristics attributed to any one of AR accessory 140a/140b/230 including IR emitter 142a/142b/342 in the present application. In other words, like AR accessories 140a and 140b, AR accessory 340 may be implemented as a virtual combat weapon, such as a virtual sword or shooting toy, or as a virtual wand, virtual lantern, or virtual flashlight, for example. Moreover, like IR emitters 142a and 142b, in some implementations, IR emitter 342 may take the form of a highly collimated IR emitter of IR light 344, such as an IR laser.

According to the exemplary implementation shown in FIG. 3, AR accessory 340 is depicted as a virtual sword, such as a virtual light sword, for example, having virtual sword blade 341 with length 346, and having activation zone 348. It is noted that, as used in the present application, the term "activation zone", as applied to AR accessory 140a/140b/340, refers to a volumetric region of space in AR venue 126 in which AR accessory 140a/140b/340 can achieve scoring strikes or hits against a user or object within AR venue 126. For example, in the exemplary implementation shown in FIG. 3, activation zone 348 of AR accessory 140a/140b/340 may be a volumetric region surrounding a user of AR accessory 140a/140b/340 determined based on length 346 of virtual sword blade 341.

It is noted that in implementations in which AR accessory 140a/140b/340 takes a form other than the exemplary virtual sword shown in FIG. 3, activation zone 348 may be adapted to suit the particular implementational details. For instance, where AR accessory 140a/140b/340 is implemented as a shooting toy, activation zone 348 may correspond to a range and/or angle of fire of AR accessory 140a/140b/340. Alternatively, where AR accessory 140a/140b/340 is implemented as a virtual light source, activation zone 348 may correspond to a luminosity with which light from AR accessory 140a/140b/340 is emitted, or to a solid angle through which light from AR accessory 140a/140b/340 is emitted. Moreover, where AR accessory 140a/140b/340 is implemented as a virtual wand, such as a virtual magic wand, activation zone 348 may correspond to a wand length, or to a distance to which powers emanating from AR accessory 140a/140b/340 can extend.

The features shown in FIGS. 1-3 of the present application will be further described by reference to FIG. 4, which presents flowchart 400 outlining an exemplary method for providing an AR experience to a user of an AR venue, according to one implementation. With respect to the method outlined in FIG. 4, it is noted that certain details and features have been left out of flowchart 400 in order not to obscure the discussion of the inventive features in the present application.

Referring to FIG. 4 in combination with FIGS. 1 and 2, flowchart 400 begins with providing a virtual environment corresponding to AR venue 126 on display 238 (action 460). In some implementations, the virtual environment corresponding to AR venue 126 may be provided on display 238a/238b of mobile AR system 130a/230a/130b/230b by AR application 212 executed by hardware processor 234a/234b. However, in other implementations, the virtual environment corresponding to AR venue 126 may be provided on display 238a/238b of mobile AR system 130a/230a/130b/230b by AR application 112 stored in memory 106 of AR platform 102, executed by hardware processor 104.

AR venue may be a theme park attraction, a game room, or any other defined space within which an AR interactive experience can take place. Mobile AR system 130a/230a/130b/230b provides a virtual environment to user 124a/124b that not only corresponds to AR venue 126, but that corresponds to the particular perspective of user 124a/124b. In other words, mobile AR system 130a/230a may provide a virtual environment to user 124a on display 238a that shows object 128 and user 124b from the perspective of the location of user 124a within AR venue 126. By analogy, AR client system 130b/230b may provide a virtual environment to user 124b on display 238b that shows object 128 and user 124a from the perspective of the location of user 124b within AR venue 126.

Referring to FIG. 3, in addition to FIGS. 1 and 2, flowchart 400 continues with detecting a light event resulting from interaction of IR light 344 produced by AR accessory 140a/140b/340 utilized by user 124a/124b with a surface within AR venue 126 (action 462). In some implementations, detection of the light event may be performed by AR application 212, executed by hardware processor 234a/234b, and using light detector 132a/232a/132b/232b, for example. However, in other implementations, detection of the light event may be performed by AR application 112 stored in memory 106 of AR platform 102, executed by hardware processor 104, and using light detector 132a/232a/132b/232b.

As noted above, a light event may be reflection of IR light from a surface within AR venue 126. As a specific example, and as further noted above, light detector 132a/232a/132b/232b may take the form of two or more IR cameras for detecting reflections of IR light 344 produced by AR accessory 140a/140b/340 and reflected from surfaces within AR venue 126, such as surfaces corresponding to another user, and/or surfaces provided by a wearable item and/or an object within AR venue 126.

Thus, in one implementation, light detector 132a/232a may include two or more IR cameras for detecting reflections of IR light 344 produced by AR accessory 140a/340 and reflected from surfaces provided by other user 124b, and/or wearable item 150b, and/or object 128 within AR venue 126. By analogy, in that implementation, light detector 132b/232b may include two or more IR cameras for detecting reflections of IR light 344 produced by AR accessory 140b/340 and reflected from surfaces provided by other user 124a, and/or wearable item 150a, and/or object 128.

Alternatively, light detector 132a/232a/132b/232b may include two or more cameras for detecting visible light emitted from surfaces within AR venue 126, such as RGB cameras, for instance. That is to say, in one implementation, light detector 132a/232a may include two or more RGB cameras for detecting visible light produced by IR excitation material 152 in response to interaction of IR light 344 produced by AR accessory 140a/340 with surfaces provided by wearable item 150b and/or object 128 within AR venue 126. By analogy, in that implementation, light detector 132*b*/232*b* may include two or more RGB cameras for detecting visible light produced by IR excitation material 152 in response to interaction of IR light 344 produced by AR accessory 140*b*/340 with surfaces provided by wearable item 150*a* and/or object 128.

In some implementations, detecting a light event may include identifying the light event as being produced by a particular one of AR accessories 140*a*/340 or 140*b*/340. For example, IR emitter 142*a*/342 of AR accessory 140*a*/340 may be designed to emit IR light 344 using a predetermined pattern of IR emissions unique to AR accessory 140*a*/340. IR emitter 142*b*/342 of AR accessory 140*b*/340 may be analogously designed to emit IR light 344 using a predetermined pattern of IR emissions unique to AR accessory 140*b*/340.

Flowchart 400 continues with identifying a location of the light event within AR venue 126 (action 464). In some implementations, identifying the location of the light event within AR venue 126 may be performed by AR application 212, executed by hardware processor 234*a*/234*b*, for example. However, in other implementations, identifying the location of the light event within AR venue 126 may be performed by AR application 112 stored in memory 106 of AR platform 102, executed by hardware processor 104.

Flowchart 400 continues with determining whether the location of the light event is within an activation zone of AR venue 126 (action 466). In some implementations, determining whether the location of the light event is within an activation zone of AR venue 126 may be performed by AR application 212, executed by client hardware processor 234*a*/234*b*, for example. However, in other implementations, determining whether the location of the light event is within an activation zone of AR venue 126 may be performed by AR application 112 stored in memory 106 of AR platform 102, executed by hardware processor 104.

The activation zone of AR venue 126 may correspond to activation zone 348 of AR accessory 140*a*/140*b*/348, as shown in FIG. 3. As noted above, activation zone 348 of AR accessory 140*a*/140*b*/340 refers to the volumetric region of space in AR venue 126 in which AR accessory 140*a*/140*b*/340 can achieve scoring strikes or hits against another user or object within AR venue 126. For example, in the exemplary implementation shown in FIG. 3, activation zone 348 of AR accessory 140*a*/140*b*/340 may be a volumetric region surrounding a user of AR accessory 140*a*/140*b*/340 determined based on length 346 of virtual sword blade 341.

In other words, where AR accessory 140*a*/140*b*/340 takes the form of a virtual light sword having virtual sword blade length 346, the light event location may be determined to be within activation zone 348 if its location is identified to be a distance from light detector 132*a*/232*a*/132*b*/232*b* that is proportional to length 346 of virtual sword blade 341. As a specific example, in such an implementation, the light event may be determined to be within activation zone 348 if its distance from light detector 132*a*/232*a*/132*b*/232*b* is equal to approximately twice length 346 of virtual sword blade 341, or less than twice length 346.

In addition, and as also noted above, in other implementations, activation zone 348 may be adapted to suit the particular implementational details. Thus, where AR accessory 140*a*/140*b*/340 is implemented as a shooting toy, activation zone 348 may correspond to a range and/or angle of fire of AR accessory 140*a*/140*b*/340. Alternatively, where AR accessory 140*a*/140*b*/340 is implemented as a virtual light source, activation zone 348 may correspond to a luminosity with which light from AR accessory 140*a*/140*b*/340 is emitted, or to a solid angle through which light from AR accessory 140*a*/140*b*/340 is emitted. Moreover, where AR accessory 140*a*/140*b*/340 is implemented as a virtual wand, such as a virtual magic wand, activation zone 348 may correspond to a wand length, or to a distance to which powers emanating from AR accessory 140*a*/140*b*/340 can extend.

It is noted that although FIG. 3 associates activation zone 348 with AR accessory 140*a*/140*b*/340, in some implementations, AR venue 126 may include one or more activation zones independent of AR accessory 140*a*/140*b*/340 per se. For example, in one implementation, when mobile AR system 130*a*/230*a* determines a general location of user 124*b* (i.e., the adversary of user 124*a* utilizing AR system 130*a*/230*a*), an activation zone other than activation zone 348 may coincide in general with the determined location of user 124*b*. Analogously, when mobile AR system 130*b*/230*b* determines a general location of user 124*a*, another activation zone may coincide in general with the determined location of user 124*a*. In other words, AR venue 126 may include multiple activation zones for enhancing the AR experience of users 124*a* and 124*b*.

Flowchart 400 can conclude with rendering a visual effect corresponding to the light event on display 238*a*/238*b* if the location of the light event is within the activation zone (action 468). In some implementations, rendering the visual effect corresponding to the light event on display 238*a*/238*b* may be performed by AR application 212, executed by hardware processor 234*a*/234*b*, for example. However, in other implementations, rendering a visual effect corresponding to the light event on display 238*a*/238*b* if the location of the light event is within the activation zone 348 of AR venue 126 may be performed by AR application 112 stored in memory 106 of AR platform 102, executed by hardware processor 104.

The particular visual effect rendered on display 238*a*/238*b* depends on the particular implementation of AR accessory 140*a*/140*b*/340 utilized by user 124*a*/124*b*, as well as the surface interacting with IR light 344 produced by AR accessory 140*a*/140*b*/340. For example, in a single user AR interaction in which user 124*a* utilizes AR accessory 140*a*/340 in the form of a virtual light sword and strikes at object 128, the visual effect rendered on display 238 may take the form of scorch marks on object 128. By analogy, where user 124*a* utilizes AR accessory 140*a*/340 in the form of a blaster type shooting toy, the visual effect rendered on display 238 may take the form of holes shot through object 128.

As an alternative example, in a multi-user interaction in which users 124*a* and 124*b* utilize respective AR accessories 140*a*/340 and 140*b*/340 in the form of virtual swords or shooting toys, the visual effect rendered on display 238 may take the form of scoring strikes or hits by one user on another. Moreover, in some implementations, users 124*a* and 124*b* may don respective wearable items 150*a* and 150*b* having IR excitation material 152 deposited thereon to enable identification of a hit location based on the resulting light event.

For instance, wearable item 150*a* may be a jump suit type article of clothing covering the limbs and torso of user 124*a*. IR excitation material 152 emitting green visible light, for example, in response to illumination by IR light may be used to cover the sleeves of wearable item 150*a*. Analogously, IR excitation material 152 emitting red visible light, for example, in response to illumination by IR light may be used to cover the leg portions of wearable item 150*a*, while IR excitation material 152 emitting blue visible light may be used to cover the torso portion of wearable item 150*a*. In such an implementation, a visual effect registering a scoring strike or hit on a particular body region of user 124a by user 124b could be rendered on display 238b of mobile AR system 130b/230b based on the color of the visible light emitted from wearable item 150a. Moreover, as an alternative to a substantially pure color, various patterns of coloration produced by emission of visible light by IR excitation material 152 could be used to identify the location of a scoring strike or hit achieved by either of users 124a and 124b.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An augmented reality (AR) system for providing an AR experience to a user utilizing an AR accessory within an AR venue, the AR system comprising:
   a hardware processor;
   a memory;
   a light detector;
   a display; and
   an AR application stored in the memory and executed by the hardware processor to:
      provide a virtual environment corresponding to the AR venue on the display;
      detect, using the light detector, a light event resulting from interaction of a light produced by the AR accessory with a surface within the AR venue, wherein the surface corresponds to another user within the AR venue;
      identify a location of the light event within the AR venue;
      determine whether the identified location of the detected light event is within a volumetric region surrounding the AR accessory;
      when the determining determines that the identified location of the detected light event is not within the volumetric region surrounding the AR accessory, not render any visual effect in response to the detected light event; and
      when the determining determines that the identified location of the detected light event is within the volumetric region surrounding the AR accessory, render a visual effect corresponding to the light event on the display, in response to the detected light event.

2. The AR system of claim 1, wherein the reflection occurs on the surface within the AR venue.

3. The AR system of claim 2, wherein the light detector comprises an IR camera.

4. The AR system of claim 1, wherein the AR accessory includes an infrared (IR) laser, and wherein the light is an IR light produced by the IR laser.

5. The AR system of claim 1, wherein the AR accessory is a sword, and wherein the volumetric region surrounding the sword is determined based on a length of the sword.

6. The AR system of claim 1, wherein the light event comprises emission of visible light from the surface within the AR venue.

7. The AR system of claim 6, wherein the light detector comprises an RGB camera.

8. The AR system of claim 6, wherein the surface includes thereon an infrared (IR) excitation material, and wherein the visible light is produced by the IR excitation material.

9. The AR system of claim 1, wherein the location of the light event within the AR venue is identified using triangulation.

10. A method for use by an augmented reality (AR) system including a hardware processor, a memory storing an AR application, a light detector, and a display, for providing an AR experience to a user utilizing an AR accessory within an AR venue, the method comprising:
   providing, using the hardware processor, a virtual environment corresponding to the AR venue on the display;
   detecting, using the hardware processor and the light detector, a light event resulting from interaction of a light produced by the AR accessory with a surface within the AR venue, wherein the surface corresponds to another user within the AR venue;
   identifying, using the hardware processor, a location of the light event within the AR venue;
   determining, using the hardware processor, whether the identified location of the detected light event is within a volumetric region surrounding the AR accessory;
   when the determining determines that the identified location of the detected light event is not within the volumetric region surrounding the AR accessory, not rendering any visual effect in response to the detected light event; and
   when the determining determines that the identified location of the detected light event is within the volumetric region surrounding the AR accessory, rendering, using the hardware processor, a visual effect corresponding to the light event on the display, in response to the detected light event.

11. The method of claim 10, wherein the reflection occurs on the surface within the AR venue.

12. The method of claim 11, wherein detecting the light event comprises using an IR camera to detect the reflection of the IR light.

13. The method of claim 10, wherein the AR accessory includes an infrared (IR) laser, and wherein the light is an IR light produced by the IR laser.

14. The method of claim 10, wherein the AR accessory is a sword, and wherein the volumetric region surrounding the sword is determined based on a length of the sword.

15. The method of claim 10, wherein the light event comprises emission of visible light from the surface within the AR venue.

16. The method of claim 15, wherein detecting the light event comprises using an RGB camera to detect the light event.

17. The method of claim 15, wherein the surface includes thereon an infrared (IR) excitation material, and wherein the visible light is produced by the IR excitation material.

18. The method of claim 10, wherein the location of the light event within the AR venue is identified using triangulation.

\* \* \* \* \*